United States Patent
Leung et al.

(10) Patent No.: US 6,700,676 B1
(45) Date of Patent: Mar. 2, 2004

(54) DIGITAL NETWORK INTERFACE FOR ANALOG FAX EQUIPMENT

(75) Inventors: Nikolai K. N. Leung, San Diego, CA (US); Johnny K. John, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/460,872

(22) Filed: Dec. 13, 1999

Related U.S. Application Data

(63) Continuation of application No. 08/766,639, filed on Dec. 13, 1996, now Pat. No. 6,038,037.

(51) Int. Cl.⁷ .............................................. G06F 13/00
(52) U.S. Cl. ..................... 358/1.15; 358/442; 358/434; 358/468
(58) Field of Search ................ 358/1.15, 442, 358/444, 404, 434, 435–440, 468, 400, 403, 407

(56) References Cited

U.S. PATENT DOCUMENTS

| | | | |
|---|---|---|---|
| 4,727,429 A | 2/1988 | Ueno | 358/256 |
| 4,771,335 A | 9/1988 | Obara | 358/258 |
| 5,012,489 A | 4/1991 | Burton et al. | 375/8 |

(List continued on next page.)

FOREIGN PATENT DOCUMENTS

| | | | |
|---|---|---|---|
| EP | 0625841 | 5/1994 | H04N/1/00 |
| WO | 9202100 | 2/1992 | H04N/1/32 |
| WO | 9307707 | 4/1993 | H04M/11/06 |
| WO | 9415433 | 7/1994 | H04N/1/00 |
| WO | 9515644 | 6/1995 | H04N/1/333 |
| WO | 9605690 | 2/1996 | H04N/1/00 |

OTHER PUBLICATIONS

"Recommendation V.21" CCITT 1984, pp. 65–69.
"Toward a North American Standard for Mobile Data Services", *Digital Signal Processing 2*, Richard A. Dean et al., 1992, 27–32.
"The GSM System for Mobile Communication", Lassay–Les–Chateaux, Mouly M. et al., 1993.
"Layer 2 Operation for Data/Fax", The Omni International Hotel, by Ericsson, Mar. 1–5, 1993.
"Data Services Working Paper: Protocol Structure for Data Services, Draft 1", The Omni International Hotel, Richard P. Ejzak, Mar. 2, 1993.

(List continued on next page.)

*Primary Examiner*—Mark Wallerson
(74) *Attorney, Agent, or Firm*—Philip Wadsworth; Kent Baker; Kyong H. Macek

(57) ABSTRACT

A novel and improved method and apparatus for providing an interface to a digital wireless telephone system compatible with standard analog wire line fax machines is described. To process a fax, a source interface waits until an interface to a destination fax machine has been established before establishing an interface to a source fax machine. The source fax transmission rate must be less than or equal to the destination fax transmission rate and the data rate of the digital channel. To establish the source fax interface at the proper rate, the source interface first selects and initial data rate from a set of standard fax transmission rates. The source interface sends unacceptable rate (failure to train) messages to the source fax machine until the source fax transmission rate is less than or equal to the data channel rate and the destination fax transmission rate. During fax processing, the destination interface inserts non-printing data (fill bits) if the destination fax transmission rate is greater than the source fax transmission rate. Fill bits are also inserted to compensate for transmission delays.

14 Claims, 11 Drawing Sheets

U.S. PATENT DOCUMENTS

| | | | |
|---|---|---|---|
| 5,297,203 A | 3/1994 | Rose et al. | 380/9 |
| 5,351,134 A | 9/1994 | Yaguchi et al. | 358/435 |
| 5,377,017 A | 12/1994 | Lam | 358/405 |
| H1413 H | 2/1995 | Gunn | 375/8 |
| 5,452,289 A | 9/1995 | Sharma et al. | 370/32.1 |
| 5,473,676 A | 12/1995 | Frick et al. | 379/99 |
| 5,491,565 A * | 2/1996 | Naper | 358/468 |
| 5,515,178 A | 5/1996 | Dimolitsas et al. | 358/445 |
| 5,517,323 A | 5/1996 | Propach et al. | 358/409 |
| 5,566,000 A | 10/1996 | Propach et al. | 358/412 |
| 5,661,568 A | 8/1997 | Ueno | 358/435 |
| 5,663,807 A | 9/1997 | Propach et al. | 358/426 |
| 5,671,270 A | 9/1997 | Yoshida | 379/100 |
| 5,754,310 A | 5/1998 | Aoki et al. | 358/406 |
| 5,790,641 A | 8/1998 | Chan et al. | 379/100.17 |
| 5,808,751 A | 9/1998 | Hochman | 358/400 |

OTHER PUBLICATIONS

"Burst Discriminator Options for Advanced Services", The Omni International Hotel, Richard P. Ejzak, Mar. 4, 1993.

"Foreward", Telecommunications Industry Association, Async–Data and Fax Services, Jul. 11, 1994.

"Interoperable Wireless Data", IEEE Communications Magazine, David Weissman et al., Feb. 1993, pp. 68–77.

* cited by examiner

DIGITAL NETWORK INTERFACE FOR ANALOG FAX EQUIPMENT

CROSS-REFERENCE TO RELATED APPLICATION

This is a continuation of U.S. application Ser. No. 08/766,639, filed Dec. 13, 1996, now U.S. Pat. No. 6,038,037, issued Mar. 14, 2000 to Leung et al., entitled "Digital Network Interface for Analog Fax Equipment."

BACKGROUND OF THE INVENTION

I. Field of the Invention

The present invention relates to an interface for a digital wireless telephone system. More particularly, the present invention relates to a digital network interface that is compatible with standard analog fax machines.

II. Description of the Related Art

Analog facsimile (fax) machines transmit digital data representative of paper documents over analog transmission systems by converting the digital data into sinusoidal tones. FIG. 1 is a block diagram of two fax machines 2 coupled via an analog transmission system 4. Generally, analog transmission system 4 is the public switched telephone network (PSTN), which is the wire line telephone network used to provide conventional telephone service.

Increasingly, data transmission is being performed via the use of digital transmission systems such as the Internet in addition to, or instead of, analog transmission systems. FIG. 2 is a block diagram of two fax machines 2 coupled via an analog transmission system 8 and a digital wireless transmission system 6.

One particularly important type of digital network is a digital wireless cellular telephone system which uses digital signal, processing and digital communication techniques to provide efficient wireless telephone service using radio frequency (RF) signals. FIG. 3 is a block diagram of a typically configured digital cellular telephone system. Subscriber units 10 and 11 (usually cellular telephones) interface with base stations 12 via the use of digitally modulated RF signals, and base station controller 14 provides various call management functionality to allow mobile communications to be conducted.

Additionally, FIG. 3 shows subscriber unit 10 in communication with two base stations 12 in a state referred to as soft handoff, which is consistent with the use of the IS-95 over-the-air cellular telephone system interface standard, which incorporates the use of Code Division Multiple Access (CDMA) signal processing and communications to provide highly efficient and robust cellular telephone service.

Digital transmission systems in general, and wireless digital transmission systems in particular, have substantially different transmission characteristics than analog transmission systems. These differing transmission characteristics include variable transmission delay created by transmission retry attempts and an inability to transmit tones in complete fashion because of the use of lossy encoding. Lossy encoding is performed on voice and other audio information transmitted using a digital cellular telephone system to minimize the amount of data necessary to conduct voice communication.

Additionally, the maximum data transmission rate of a voice channel in a digital wireless telephone system is much less than that of a wire base analog telephone system. Voice communication is conducted over these reduced rate channels via the use of the lossy encoding mentioned above, which is more efficient than analog systems and other non-lossy encoding techniques.

These different transmission characteristics make wireless digital transmission systems incompatible with the use of analog fax machines. For example, while voice communication can tolerate lossy encoding, analog fax transmissions cannot. Additionally, analog fax transmissions generally require higher data rate channels than those offered by wireless digital telecommunications systems.

As the cost of digital wireless telecommunications service decreases with the increased availability of RF spectrum and the introduction of more efficient digital technology, the use of digital wireless telephone systems as a primary source of telephone service will increase. For individuals and businesses that already possess analog fax machines, however, it will be desirable to continue to use analog fax machines with the digital wireless telephone. Thus, there is a need for a method and apparatus for allowing analog fax machines to conduct communication over a connection that includes a digital network, including a digital wireless telecommunications system.

SUMMARY OF THE INVENTION

The present invention is a novel and improved method and apparatus for providing an interface to a digital wireless telephone system compatible with standard analog wire line fax machines. To process a fax, a source interface waits until an interface to a destination fax machine has been established before establishing an interface to a source fax machine. The source fax interface rate must be less than or equal to the destination fax interface rate and the data rate of the digital channel. To establish the source fax interface at the proper rate, the source interface first selects an initial data rate from a set of standard fax transmission rates. The source interface sends unacceptable rate (failure to train) messages to the source fax machine until the source fax interface rate is less than or equal to the data channel rate and the destination fax interface rate. During fax processing, the destination interface inserts non-printed data (fill bits) if the destination fax transmission rate is greater than the source fax transmission rate.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

A digital network interface that is compatible with standard analog fax machines is described. Fax calls must conform to behavior as specified in "ITU-T Recommendation T.30: Procedures For Document Facsimile Transmission in the General Switched Telephone Network" incorporated herein by reference. In the exemplary embodiment, parameter negotiation at the beginning of a fax call is accomplished in accordance with T.30 using the modulation techniques specified in "CCITT Recommendation V.21: 300 BPS Duplex Modem Standardized For Use in the General Switched Telephone Network (GSTN)" incorporated herein by reference.

Figure 1:
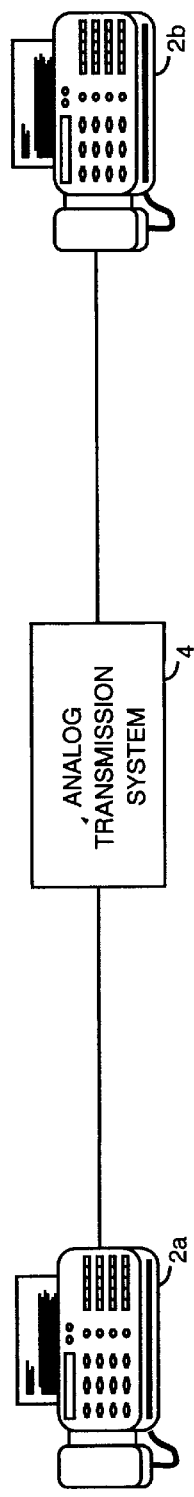
FIG. 1 is a block diagram of two fax machines coupled via an analog transmission system.
Figure 2:
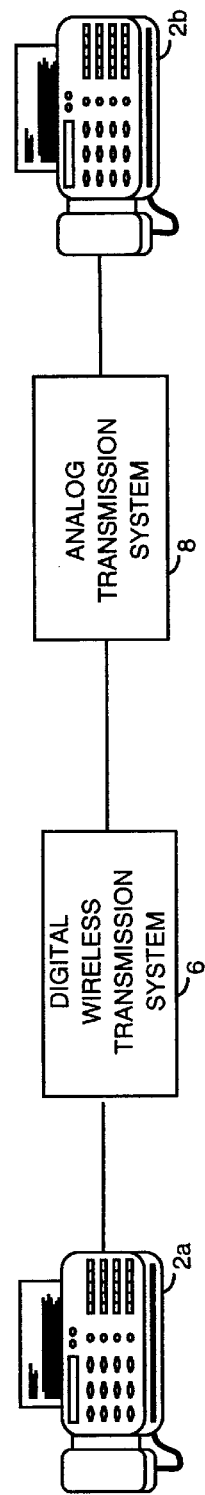
FIG. 2 is a block diagram of two fax machines coupled via an analog transmission system and a digital wireless transmission system.
Figure 3:
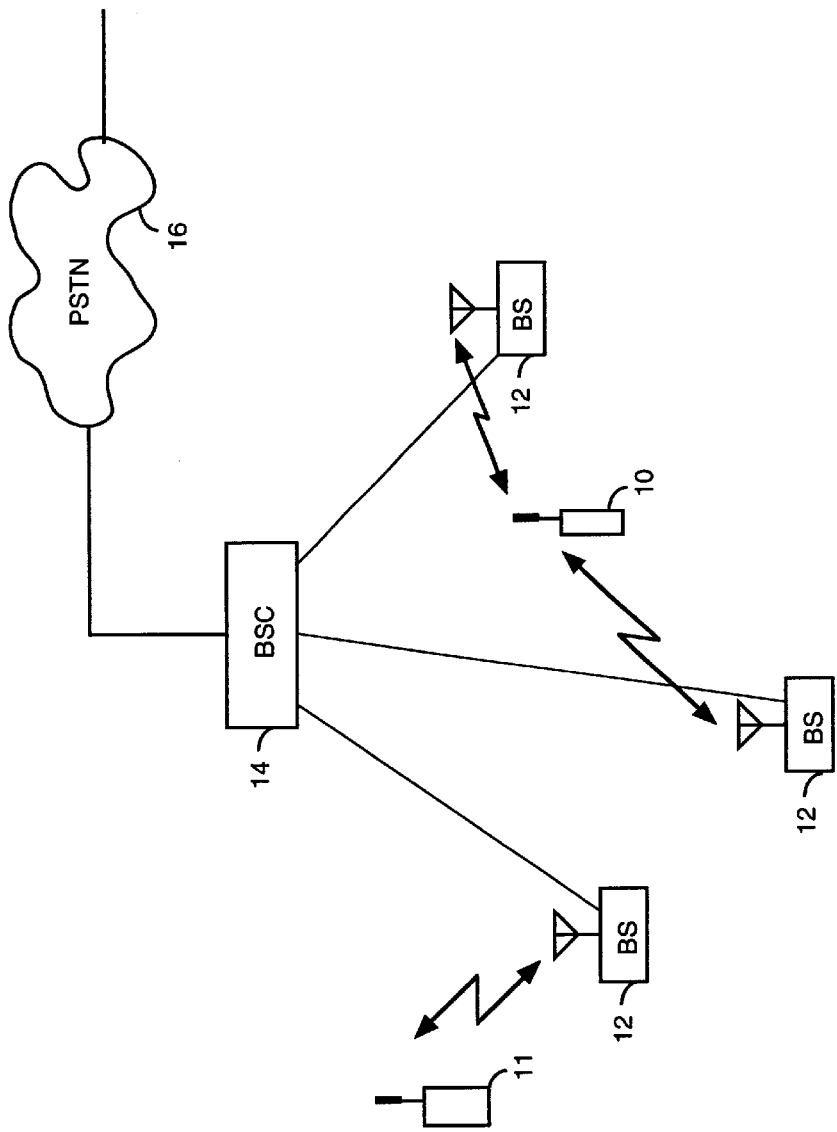
FIG. 3 is a block diagram of a digital wireless cellular telephone system.
Figure 4A:
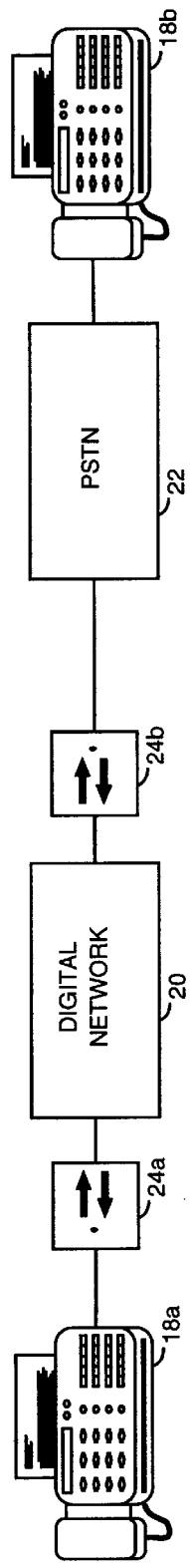
FIGS. 4A–4E are block diagrams of two fax machines connected in accordance with the one embodiment of the present invention.

FIG. 4A is a block diagram of two analog fax machines 18a and 18b coupled together by digital network 20, PSTN 22 and analog fax interfaces 24a and 24b which are located at either side of digital network 20. The analog interface side of each of analog fax interfaces 24a and 24b is indicated with a dot, and the two arrows indicate the bi-directional capability of each of analog fax interfaces 24a and 24b.

Figure 4B:
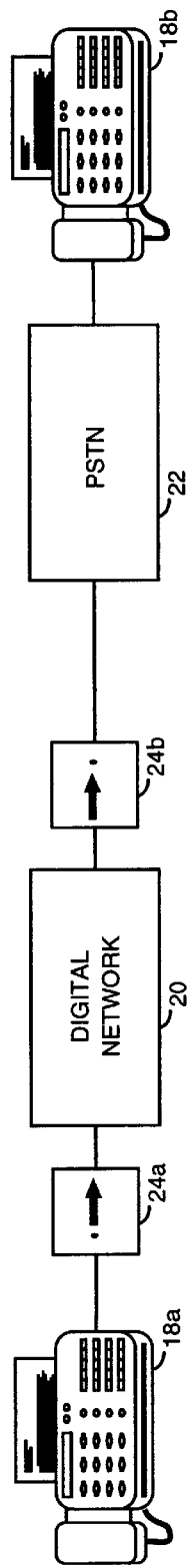

FIG. 4B illustrates the configuration of analog fax interfaces 24a and 24b when an analog fax is transmitted from analog fax machine 18a to analog fax machine 18b. In accordance with the present invention, analog fax interfaces 24a and 24b are configured to process the fax in direction of transmission as indicated by the arrows.

When a fax is transmitted in the direction shown, analog fax machine 18a is referred to as the "source fax machine" and analog fax machine 18b is the "destination fax machine." Similarly, analog fax interface 24a is referred to as the "source interface" and analog fax interface 24b is referred to as the "destination interface."

Figure 4C:
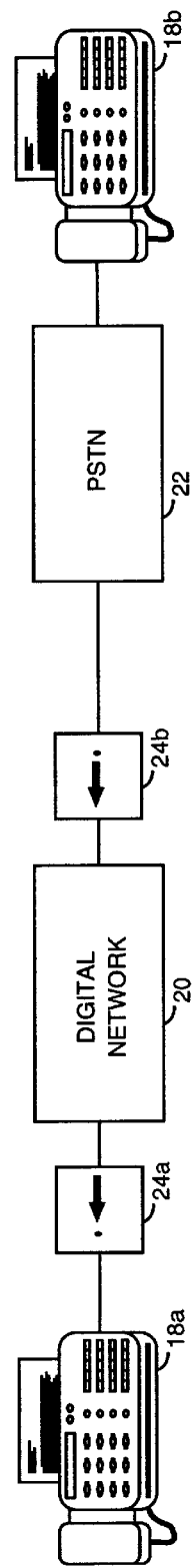

FIG. 4C illustrates the configuration of analog fax interfaces 24a and 24b when an analog fax is transmitted from analog fax machine 18b to analog fax machine 18a. In this configuration, analog fax machine 18b is the source fax machine and analog fax machine 18a is the destination fax machine, and analog fax interface 24b is referred to as the source interface and interface 24a is the destination interface.

Figure 4D:
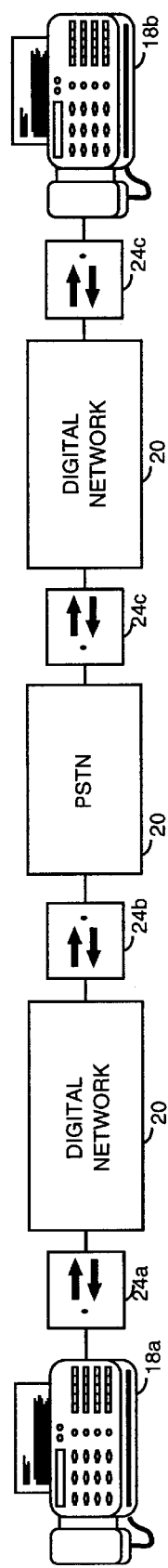

FIG. 4D illustrates that two analog fax machines 18a and 18b may communicate via two digital networks if, in accordance with the preferred embodiment of the invention, a pair of analog fax interfaces 24a and 24b are placed around each digital network. Each of analog fax interfaces 24a and 24b makes each digital network 20 appear as an analog transmission system to the analog fax machines 18a and 18b, which allows a fax to be properly transmitted across multiple digital networks 20. In the case where the digital network is a digital cellular telephone system, the configuration of FIG. 4D corresponds to a tandem mobile-to-mobile fax transmission.

Figure 4E:
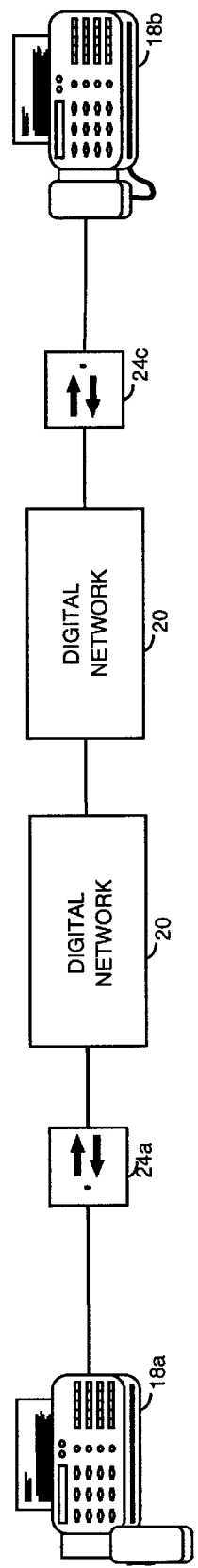

FIG. 4E illustrates that two analog fax machines 18a and 18b may communicate via two adjacent digital networks if, in accordance with the preferred embodiment of the invention, a pair of analog fax interfaces 24a and 24b are placed around the pair of digital networks. In this configuration, digital data is exchanged directly between the two digital networks without the need to convert the data into a form suitable for transmission over an analog network. In the case where the digital network is a digital cellular telephone system, the configuration of FIG. 4E corresponds to a non-tandem mobile-to-mobile fax transmission.

In the preferred embodiment of the invention the signal modulation and control operations performed by source interface 24a and destination interface 24b are carried out using a single digital signal processor integrated circuit. These control operations include processing and responding to signaling messages received via the analog input in accordance with the operation of a standard fax machine.

Referring again to FIG. 4B, in an exemplary fax transmission source interface 24a and destination interface 24b must perform various steps to properly transmit a fax from source fax machine 18a to destination fax machine 18b.

Figure 5A:
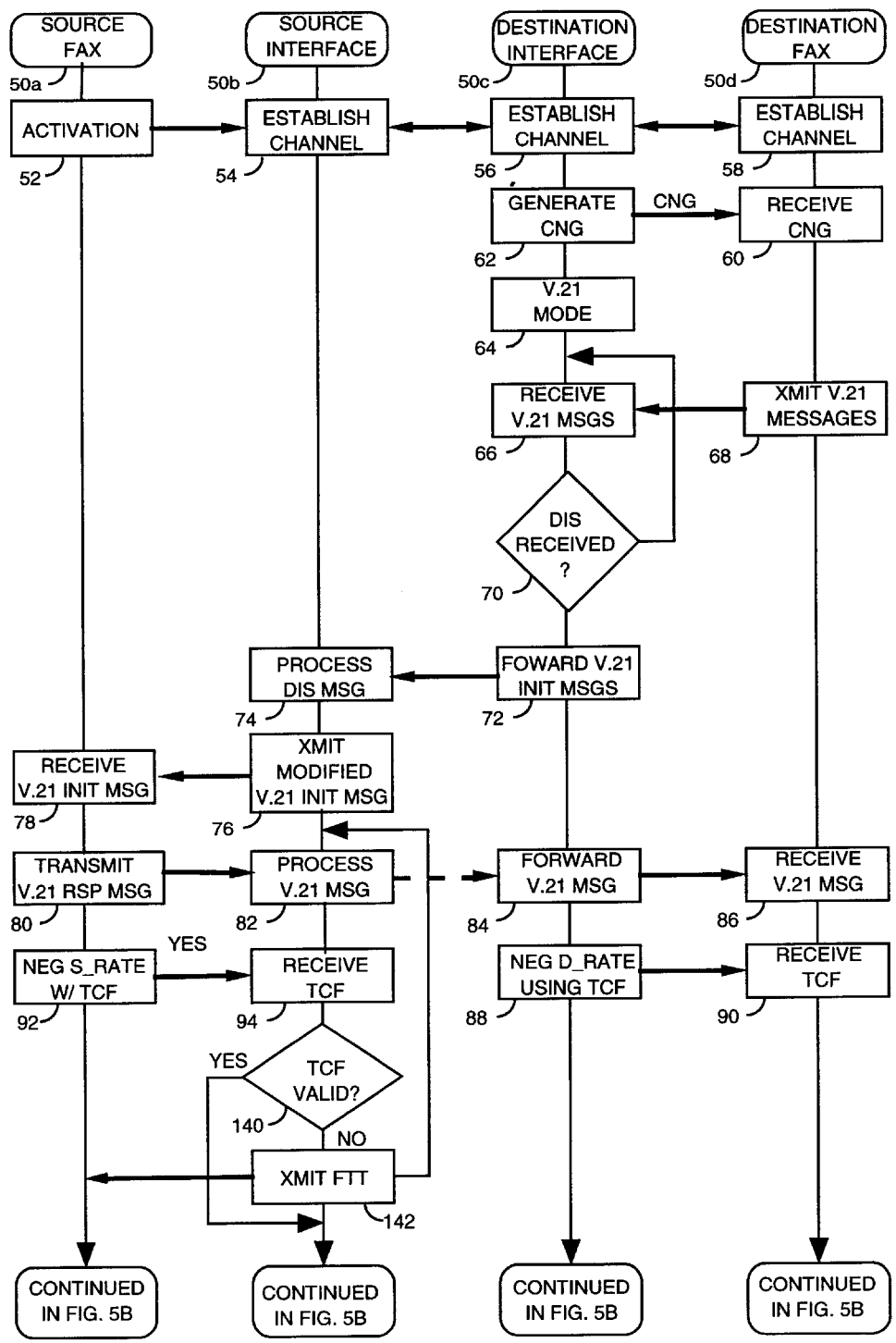
FIGS. 5A–5C are flow diagrams of the operation of various systems during fax processing when performed in accordance with one embodiment of the invention.

FIG. 5A is a flow diagram illustrating the operation of source interface 24a and destination interface 24b when processing a fax from source fax machine 18a to destination fax machine 18b in accordance with one embodiment of the invention. In general, messages transmitted between systems are shown as bold horizontal lines, and dashed lines indicate a message transmission which may or may not take place at the time shown, while solid lines indicate messages that should be transmitted during orderly operation. Also, only those steps performed by source fax machine 18a and destination fax machine 18b that pertain to the operation of the invention are shown, as all other steps will be apparent to one skilled in the art and would only obscure the description of the invention. The transmission of the fax begins at steps 50a–d, and at step 52 the source fax machine 18a is activated causing source interface 24a to establish a rate limited digital channel with destination interface 24b at steps 54 and 56, and to record various characteristics about that digital channel including the maximum transmission rate.

Source fax machine 18a notifies source interface 24a that a fax call will take place. This notification may result from the optional Calling (CNG) tone that can be generated by source fax machine 18a in accordance with ITU-TR T.30, or from the transmission of a predetermined set of DTMF tones to the source interface 24a. One method for notifying source interface 24a that a fax communication will take place is described in U.S. patent application Ser. No. 08/719,112 entitled "DIGITAL WIRELESS TELEPHONE SYSTEM INTERFACE FOR ANALOG TELECOMMUNICATIONS EQUIPMENT," filed Sep. 24, 1996, now U.S. Pat. No. 5,864,763, issued Jan. 26, 1999 to Faus et al., and assigned to the assignee of the present invention and incorporated herein by reference. In response, source interface 24a notifies destination interface 24b through digital signaling messages that a fax call will be conducted.

In an alternate embodiment, the destination fax machine 18b can indicate to the destination interface 24b at steps 58 and 56 that fax call will take place. A method for the destination interface 24b to detect fax calls is described in U.S. patent application Ser. No. 08/751,190 entitled "METHOD AND APPARATUS FOR DETECTING FACSIMILE TRANSMISSION," filed Nov. 15, 1996, now U.S. Pat. No. 5,892,816, issued Apr. 6, 1999 to John et al., and also assigned to the assignee of the present invention and incorporated herein by reference.

The destination interface responds at step 56 by establishing an analog channel with destination fax machine 18b at step 58. An exemplary analog channel between destination interface 24b and destination fax machine 18b is the public switched telephone network (PSTN).

After the analog channel has been established, destination interface 24b transmits a CNG tone to the destination fax machine 18b at step 62 which is received at step 60 by destination fax machine 18b. Destination fax machine 18b may transmit a Called Terminal Identification (CED) tone (not shown) to destination interface 24b at step 60 in accordance with ITU-TR T.30.

At step 64 destination interface 24b enters V.21 mode, and at step 66 destination interface 24b processes V.21 messages from destination fax machine 18b transmitted at step 68 by converting the analog tones into digital data and examining the V.21 messages received.

Possible V.21 messages transmitted by destination fax machine 18b at this point in the fax processing are Non-Standard Facilities (NSF), Called Subscriber Identification (CSI) and Digital Identification Signal (DIS). The DIS message contains information about the fax capabilities of destination fax machine 18b including acceptable modulation protocols and maximum demodulation rates. Modulation protocols include V.27ter, V.27ter Fall Back Mode (FBM), V.29, V.33 and V.17. The protocol information is contained in a 4-bit field in the DIS message.

Additionally, the DIS message contains other information about destination fax machine 18b including Group I and Group II operation and error correction operation. Most of this other information is contained in bit fields 1–8 and 25–72 of the DIS message.

In accordance with one embodiment of the invention, destination interface 24b continues to process and examine V.21 messages at step 66 until it is determines at step 70 that a DIS message has been received. In the preferred embodiment of the invention, once the DIS message has been received, destination interface 24b forwards only the DIS message and the CSI message to source interface 24a at step 72 via the digital channel. Thus, in the preferred embodiment of the invention all non-standard features indicated in NSF message will not be received by source fax machine 18a.

At step 74, source interface 24a processes the DIS and CSI messages received from destination interface 24b. This processing includes examining the DIS message to determine the acceptable modulation protocols and maximum data rate specified, and whether the maximum data rate exceeds the maximum data rate of the digital channel between source interface 24a and destination interface 24b. If the maximum rate does exceed the digital channel rate, source interface 24a modifies the DIS message to indicate a different maximum data rate and possibly a different modulation protocol as described in greater detail below. Additionally, in one embodiment of the invention, source interface 24a discards bit fields 25–72 of the DIS message and sets bit fields 1–8 to logic zero to indicate that none of the options specified by these fields are invoked, thereby simplifying the fax processing.

Source interface 24a also modifies a minimum scan line time (MSLT) field in the DIS message to indicate a duration of 40 milliseconds (ms), which is the maximum as specified by T.30. The MSLT is a time interval allocated between the transmission of lines of the page from the source fax machine 18a to allow for printing at the destination fax machine. By modifying the DIS message to require an MSLT of 40 ms, even when destination fax machine 18b can process data lines more quickly, the invention provides a time interval between lines that can be used to recover from intermittent transmission delays introduced by the digital channel.

Table I lists the data rate and modulation protocols specified in the DIS transmitted from source interface 24a to the source fax machine 18a after modification of the DIS message at step 74 for a given digital channel rate (DCR) and the given set of fax demodulation rates specified in the DIS message received from destination interface 24b and transmitted from destination fax machine 18b ($DIS_{Dest}$).

TABLE I

| | DCR | | | | | |
|---|---|---|---|---|---|---|
| $DIS_{Dest}$ | 2400 <= DCR <4800 | 4800 <= DCR <7200 | 7200 <= DCR <9600 | 9600 <= DCR <12000 | 12000 <= DCR <14400 | 14400 <= DCR |
| V.17 or V.33 | V.27ter FBM | V.27ter | V.29 + V.27ter | V.29 + V.27ter | DNC | DNC |
| V.29 Only | V.29 + V.27ter | V.29 + V.27ter | DNC | DNC | DNC | DNC |
| V.29 + V.27ter | V.27ter FBM | V.27ter | DNC | DNC | DNC | DNC |
| V.27ter | V.27ter FBM | DNC | DNC | DNC | DNC | DNC |
| V.27ter FBM | DNC | DNC | DNC | DNC | DNC | DNC |

An entry for DNC is "do not change." As is well known in the art, V.17 includes rates of 14,400 bps, 12,000 bps, 9,600 bps, and 7,200 bps; V.33 includes rates of 14,400 bps and 12,000 bps; V.29 includes rates of 9,600 bps and 7,200bps; V.27 ter includes rates 4,800 bps and 2,400 bps; and V.27 ter FBM is rate 2,400 bps.

As will be apparent, the modulation protocols and rate specified will be greater than the digital channel rate in some instances. However, when this is the case, source interface 24a will send Failure to Train (FTT) messages in response to initial training requests from source fax machine 18a as described below until source fax machine 18a drops down to a rate supported by the digital channel.

In general, source interface 24a indicates that destination fax machine 18b can accept a protocol having a rate equal to or less than the digital channel rate and in some instances greater than the digital channel rate by the least amount. The negotiated rate between source interface 24a and source fax machine 18a is then forced to be below the lesser of the digital channel rate and the destination fax interface rate (D_RATE) via transmission of FTT messages so that the maximum source fax transmission rate that is compatible with the digital channel can be achieved.

It should also be understood that, in the preferred embodiment of the invention, source interface 24a need not indicate a modulation protocol that is acceptable to the destination fax machine 18b, as the source interface 24a will demodulate the data before transmission to destination interface 24b. Upon receipt of the demodulated data, destination interface 24b can remodulate using a modulation protocol compatible with the destination fax machine 18b, including protocols that operate at higher transmission rates as described in greater detail below.

In an alternative embodiment of the invention, destination interface 24b also forwards the NSF messages to source interface 24a, which determines if any features specified in the NSF message are inconsistent with the digital channel, and modifies the message to specify that such features are not available.

At step 76, source interface 24a modulates the modified V.21 messages including the DIS message into tones that are transmitted to source fax machine 18a. These V.21 tone messages are retransmitted until a response is received from source fax machine 18a.

Source fax machine 18a receives the V.21 tone messages at step 78, and at step 80 generates and transmits V.21 tone response messages which can include Non-Standard Features Setup (NSS), Transmitting Subscriber Identification (TSI) and Digital Command Signal (DCS). In the preferred embodiment of the invention, an NSS message will not be transmitted because destination interface 24b does not forward NSF messages. Source interface 24a converts the V.21 tone response messages into V.21 digital data responses. That is, source interface 24a demodulates the V.21 tone response messages.

After demodulating each V.21 tone response message at step 82, source interface 24a examines the DCS message to determine the transmission rate specified by the source fax machine, and forwards the digital V.21 messages to the destination interface 24b. At step 84, destination interface 24b modifies the set of MSLT bit fields (21, 22 and 23) of the DCS message to match what was originally required by destination fax machine 18b, and proceeds to remodulate and forward the modified V.21 response messages to destination fax machine 18b. Destination fax machine 18b receives the V.21 response messages at step 86.

At step 92 source fax machine 18a begins to negotiate a source transmission rate S_RATE by transmitting a Training Check Frame (TCF) message received by source interface 24a at step 94.

Similarly, at step 88 destination interface 24b begins to negotiate a destination fax transmission rate D_RATE by transmitting a Training Check (TCF) message to destination fax machine 18b. Destination fax machine 18b begins to receive the TCF message at step 90. This begins the process of independent rate negotiation.

In many instances described below, fax processing will return to steps 80 through 86. In these instances, the DCS message will not be exchanged between source interface 24a and destination interface 24b at steps 82 and 84 because the relevant information contained in a DCS message is already known by destination interface 24b. Eliminating the need to exchange this information further speeds up the process of independent rate negotiation, and therefore, further decreases the risk of timeouts.

Independent rate negotiation is the negotiation of a source fax interface rate S_RATE between source fax interface 24a and source fax machine 18a, and a destination fax interface rate D_RATE between destination interface 24b and destination fax 18b, with a minimal number of messages exchanged between source interface 18a and destination interface 18b. This is achieved by allowing the destination fax interface rate D_RATE to exceed the source fax interface rate S_RATE and the digital channel rate. Additionally, independent rate negotiation is achieved by making source interface 24a and destination interface 24b sufficiently intelligent to determine the proper interface rate without the need to communicate with one another and to process and respond to source and destination fax machines 18a and 18b in accordance with V.21 and T.30.

At step 140, source interface 24a determines if the TCF received at step 94 is valid, and if not, source interface 24a sends an FTT to source fax machine 18a at step 142 and returns to step 82 to receive the next DCS and TCF messages from destination fax machine 18b. When step 82 is performed more than once, the DCS message is not forwarded again to destination interface 24b, as was performed originally, thus keeping the rate negotiations performed by the source and destination interfaces independent. If the TCF is valid, source interface 24a proceeds to FIG. 5B.

Figure 5B:
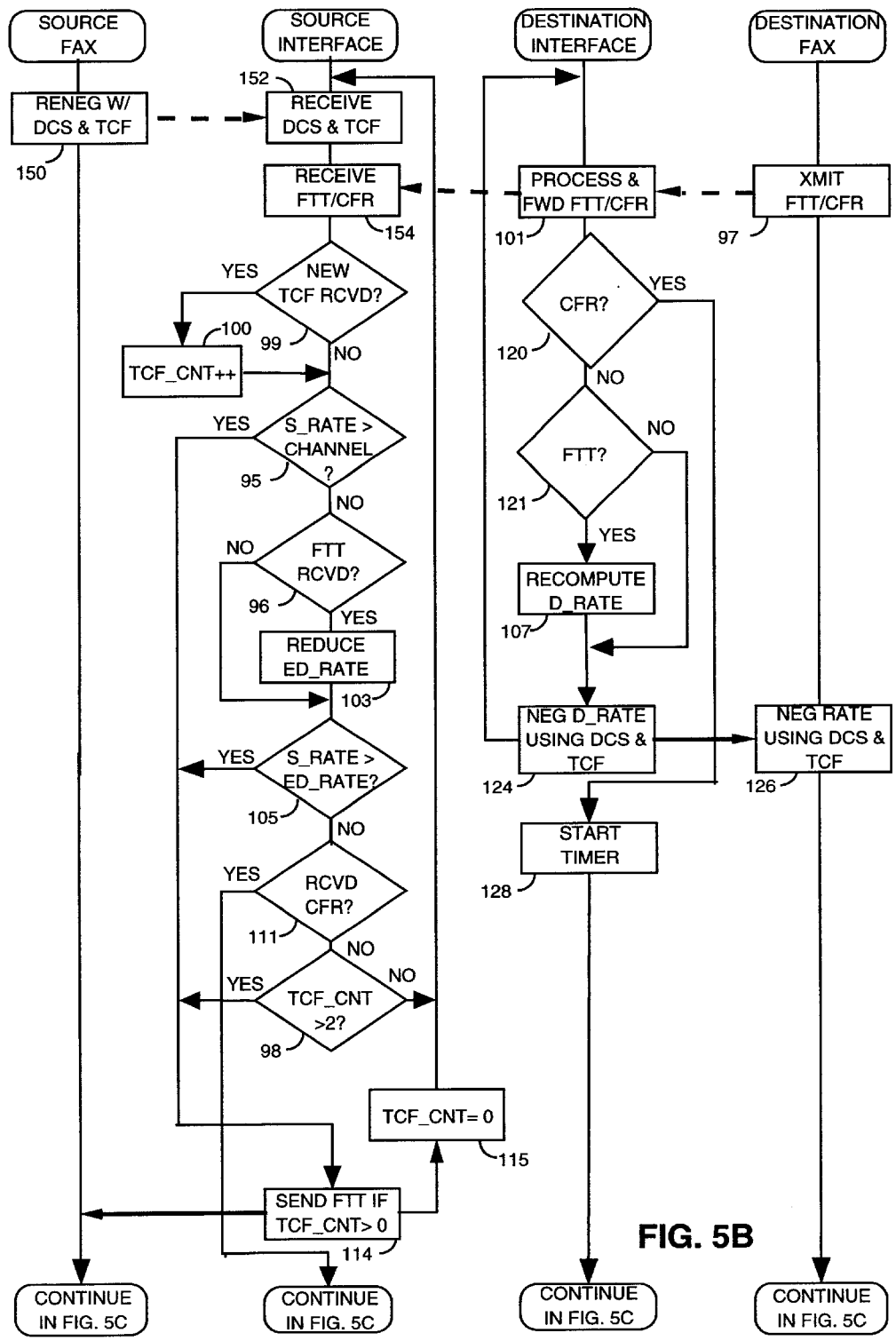

Referring now to FIG. 5B, at step 97 destination fax machine 18b responds to the TCF from destination interface 24b with either a failure to train message (FTT) or a confirmation to receive message (CFR), which is received by destination interface 24b at step 101 and demodulated and forwarded to source interface 24a.

Simultaneously, source interface 24a begins polling for additional DCS and TCF messages from source fax machine 18a at step 152, as well as for either FTT or CFR messages from destination interface 24b at step 154.

At step 99, source interface 24a determines if a new TCF has been received, and if so, increments TCF_CNT at step 100. TCF_CNT is a counter which tracks the number of TCF messages that have been received from source fax machine 18a without a response being transmitted from source interface 24a. TCF_CNT is initialized to zero (initialization not shown). If a TCF was not received, source interface 24a proceeds to step 95, however, it should be noted that in order to have arrived at step 99 from FIG. 5A, a valid TCF will have been received. Therefore TCF_CNT is incremented during the first performance of step 99 and is equal to one (1) at this time. At step 95 source interface 24a determines if the source fax interface rate S_RATE at which source fax machine 18a is attempting to train is greater than the digital channel rate, and if so, proceeds to step 114.

If the source fax interface rate S_RATE at which source fax machine 18a is attempting to train is not greater than the digital channel rate, it is determined at step 96 whether an FTT message was received at step 154, and if so, the estimate of the destination fax interface rate ED_RATE is reduced at step 103. While not shown, ED_RATE is initialized to the rate specified by source fax machine 18a in the initial DCS message. Source interface 24a then proceeds to step 105.

If it is determined at step 96 that an FTT was not received from destination interface 24b at step 154, source interface 24a proceeds to step 105. At step 105 it is determined if the source fax interface rate S_RATE is greater than the estimate of the destination fax interface rate ED_RATE, and if so, source interface proceeds to step 114.

Figure 5C:
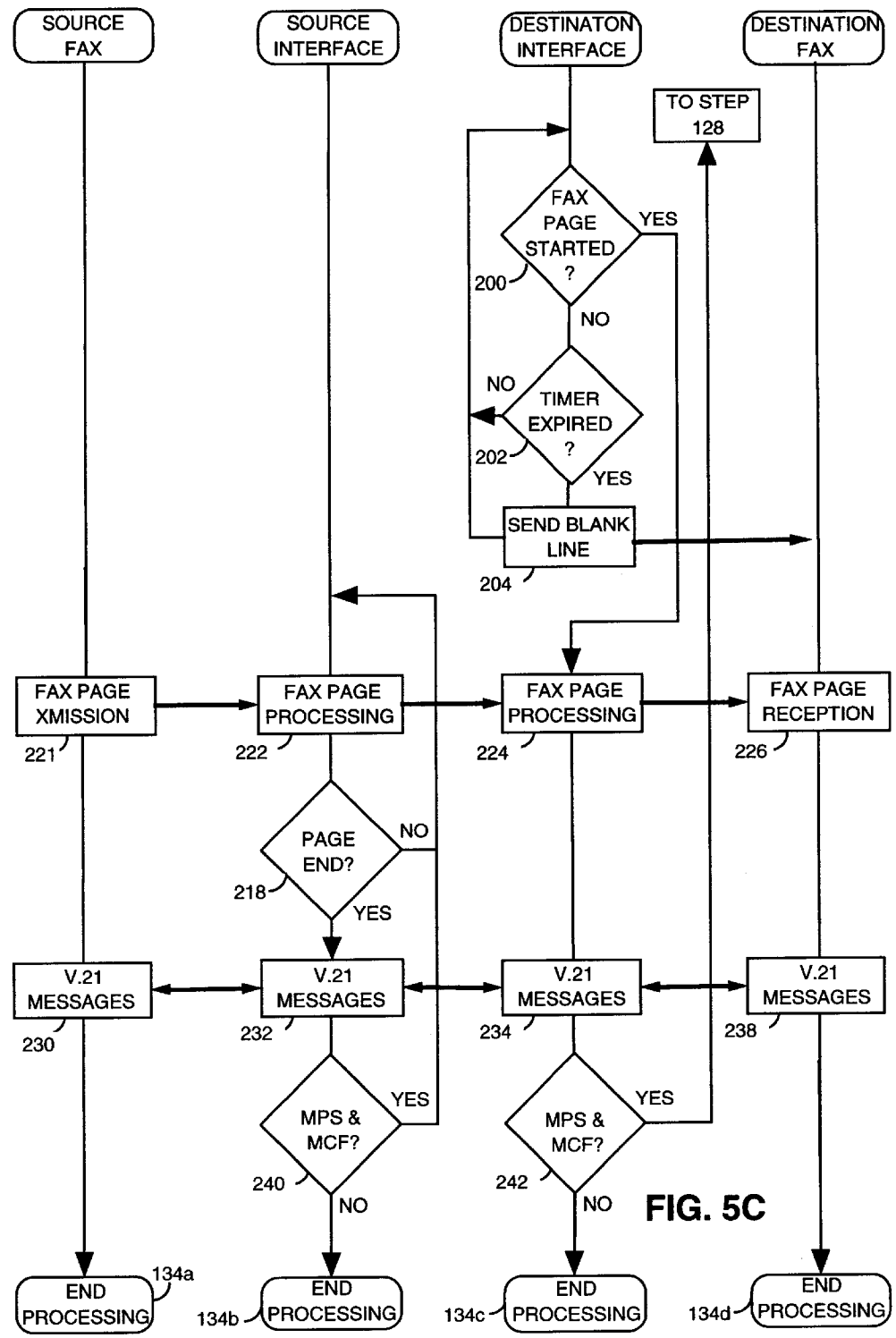

If it is determined at step 105 that the source fax interface rate S_RATE is not greater than the estimate of the destination fax interface rate ED-RATE, it is then determined at step 111 if a CFR was received at step 154, and if so source interface 24a continues fax processing as shown in FIG. 5C.

If a CFR was not received, source interface proceeds to step 98 where it is determined if TCF_CNT is greater than 2. If TCF_CNT is not greater than 2, source interface 24a returns to step 152. If TCF_CNT is greater than 2, source interface 24a proceeds to step 114.

At step 114, source interface 24a transmits an FTT message to source fax machine 18a if TCF_CNT is greater than zero. After step 114 is performed TCF_CNT is set to zero at step 115 and source interface 24a returns to step 152.

As noted above, TCF_CNT is a counter which tracks the number of TCF message that have been received from source fax machine 18a without a response being transmitted from source interface 24a. By transmitting an FTT if TCF_CNT exceeds 2, a repetition timeout at source fax machine 18a is prevented.

Simultaneous with the processing performed by source interface 24a, destination interface 24b, determines at step 120 if a CFR was received at step 101. If so, a timer is started at step 128 and fax processing continues in FIG 5C.

If a CFR was not received, destination interface 24b determines at step 121 if an FTT message was received at step 101. If an FTT message was received, the destination fax interface rate D_RATE is recomputed at step 107, and at step 124, an attempt to negotiate the recomputed destination fax interface rate D_RATE is performed via transmission of DCS and TCF messages that are received by destination fax machine 18b at step 126. After transmission of the DCS and TCF messages at step 124, the response to the new TCF message is received at step 101. If an FTT message was not received at step 101.

If it is determined at step 121 that an FTT message was not received, the destination fax interface 24b repeats the transmission of the last DCS and TCF messages at step 124 if a predetermined period of time has expired in accordance with ITU-TR T.30.

At step 150, source fax machine 18a transmits DCS and TCF messages if an FTT message or no response is received from source interface 24a.

Referring now to FIG. 5C, destination interface 24a determines at step 200 if the fax page processing has started and if so proceeds to step 224. If fax page processing has not started, it is determined at step 202 if the timer started at step 128 (FIG. 5B) has expired, and if not step 200 is performed again. If the timer has expired, a blank line is transmitted to destination fax machine 18b to prevent call drop due to a timeout. After the blank line is transmitted, step 200 is performed again and in the preferred embodiment of the invention, blank lines are repeatedly transmitted at 1-second intervals until the fax page transmission starts. Other intervals may be used, however, intervals of more than 2 seconds are not preferred.

Source fax machine 18a begins transmitting the fax page at step 221 in the form of fax tones that are received by source interface 24a via the analog connection. Source interface 24a performs fax tone processing at step 222 by converting the fax tones into digital data, stripping out any fill bits in each line, and by forwarding that digital data to destination interface 24b via the digital channel.

Destination interface 24b receives the digital data and performs fax processing at step 224 by converting the digital data back into fax tones that are transmitted to destination fax machine 18b. The fax tones are received by destination fax 18b at step 226.

During the course of the fax processing, destination interface 24b inserts fill bits into the data being transmitted to destination fax machine 18b at step 224 to meet the MSLT requirements of destination fax machine 18b and to compensate for a destination fax transmission rate D_RATE that is greater than the source fax transmission rate S_RATE. The procedure for inserting fill bits is described in greater detail below.

At the end of each line of fax data transmitted, source interface 24a determines at step 218 if a complete page of fax data has been transmitted, and if not, returns to step 222. After a complete page has been transmitted, V.21 message processing is performed at steps 230–238 as described in greater detail below.

At step 240, source interface 24a determines if Multi-Page Signal (MPS) and Message Confirmation (MCF) messages were received at step 232. If not, fax page processing ends at steps 134a–d. If MPS and MCF messages were received, source interface 24a resumes fax page processing at step 222.

At step 242, destination interface 24b determines if MPS and MCF messages were received at step 234, and if so returns to step 128 of FIG. 5B. If MPS and MCF messages were not received at step 234, fax page processing ends at step 134c.

In some instances, an end of message (EOM) may be processed at steps 230 and 238, indicating that the fax has been transmitted, but that an additional document may be transmitted with different parameters. In this case, processing will resume at step 68 of FIG. 5A.

In other instances, a Retrain Negatice (RTN) message from the destination fax machine 18b may be processed indicating a need to retrain. In this case, fax processing resumes at steps 80 through 86 of FIG. 5A.

In still other instances, a Retrain Positive (RTP) message will be received from destination fax machine 24b. If the RTP message is received in response to an MPS message, fax processing resumes at steps 80–86 of FIG. 5A.

Figure 6:
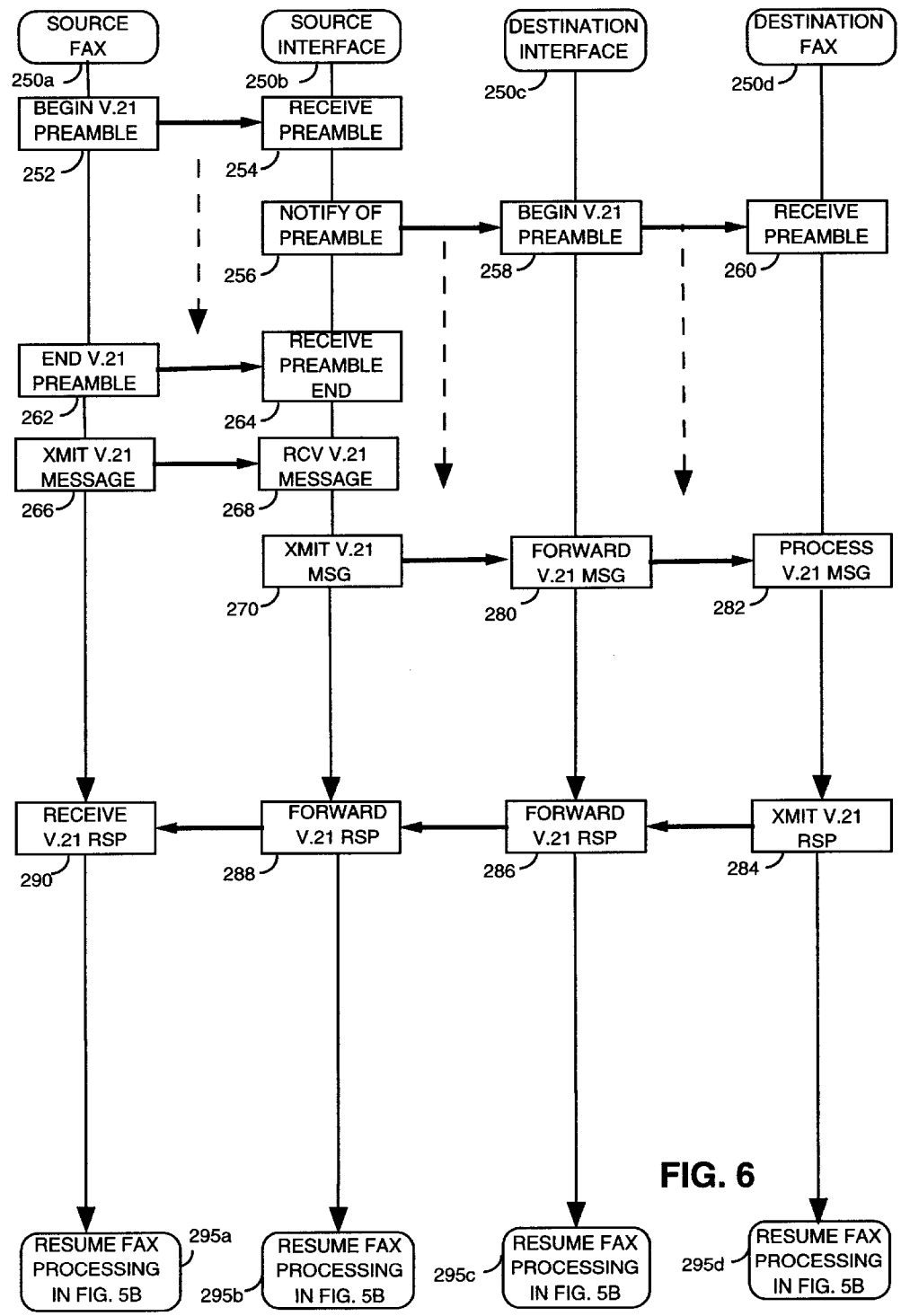
FIG. 6 is a flow diagram illustrating the steps performed during page end processing in accordance with one embodiment of the invention.

FIG. 6 is a flow diagram illustrating the steps performed by source fax machine 18a, source interface 24a, destination interface 24b, and destination fax machine 18b when processing the V.21 messages at steps 230–238 of FIG. 5C in accordance with one embodiment of the invention. Page end processing begins at steps 250a–d, and at step 252 the source fax machine 18a begins to transmit a V.21 preamble message.

Source interface 24a begins to receive the preamble message at step 254, and after a short duration, notifies destination interface 24b that the preamble is being received via a digital message transmitted at step 256. Destination interface 24b receives notification at step 258 and responds by beginning to generate a V.21 preamble that is received at the destination fax machine at step 260.

At step 262, the transmission of the V.21 preamble message from the source fax machine 18a ends, which is detected at the source interface 24a at step 264. At step 266, source fax machine 18a transmits an End of Procedures (EOP), MPS, or End of Message (EOM) V.21 message which is received at source interface 24a at step 268.

At step 270 source interface 24a transmits the digital V.21 message to destination interface 24b. In response, destination interface 24b ensures that the transmission of the V.21 preamble has at least one (1) second duration, and if so ends transmission of the V.21 preamble at step 280. Destination interface 24b then converts the digital V.21 message to a tonal V.21 message which is appended to the preamble and which is received and processed by destination fax machine 18b at step 282.

At step 284 destination fax responds by transmitting V.21 response messages which could be Message Confirmation (MCF), Retrain Positive (RTP), and Retrain Negative (RTN) which are converted into digital messages by destination interface 24b at step 286. The digital V.21 messages are received and converted into tonal V.21 messages by source interface 24a at step 288 and the tonal V.21 messages are received by source fax machine 18a at step 290. It should be understood that steps 284–290 are conducted using the "preamble pipelining" as performed during the processing shown in steps 252 to 282, only in the reverse direction.

Thus, source interface 24a pipelines transmission of the V.21 preamble by initiating transmission of the preamble from destination interface 24b before transmission of the preamble from the source fax machine 18a terminates. Pipelining transmission of the V.21 preamble message during the page end reduces the time necessary to process the preamble message, thereby allowing the V.21 messages to be transmitted more quickly to meet T.30 timing requirements.

Figure 7:
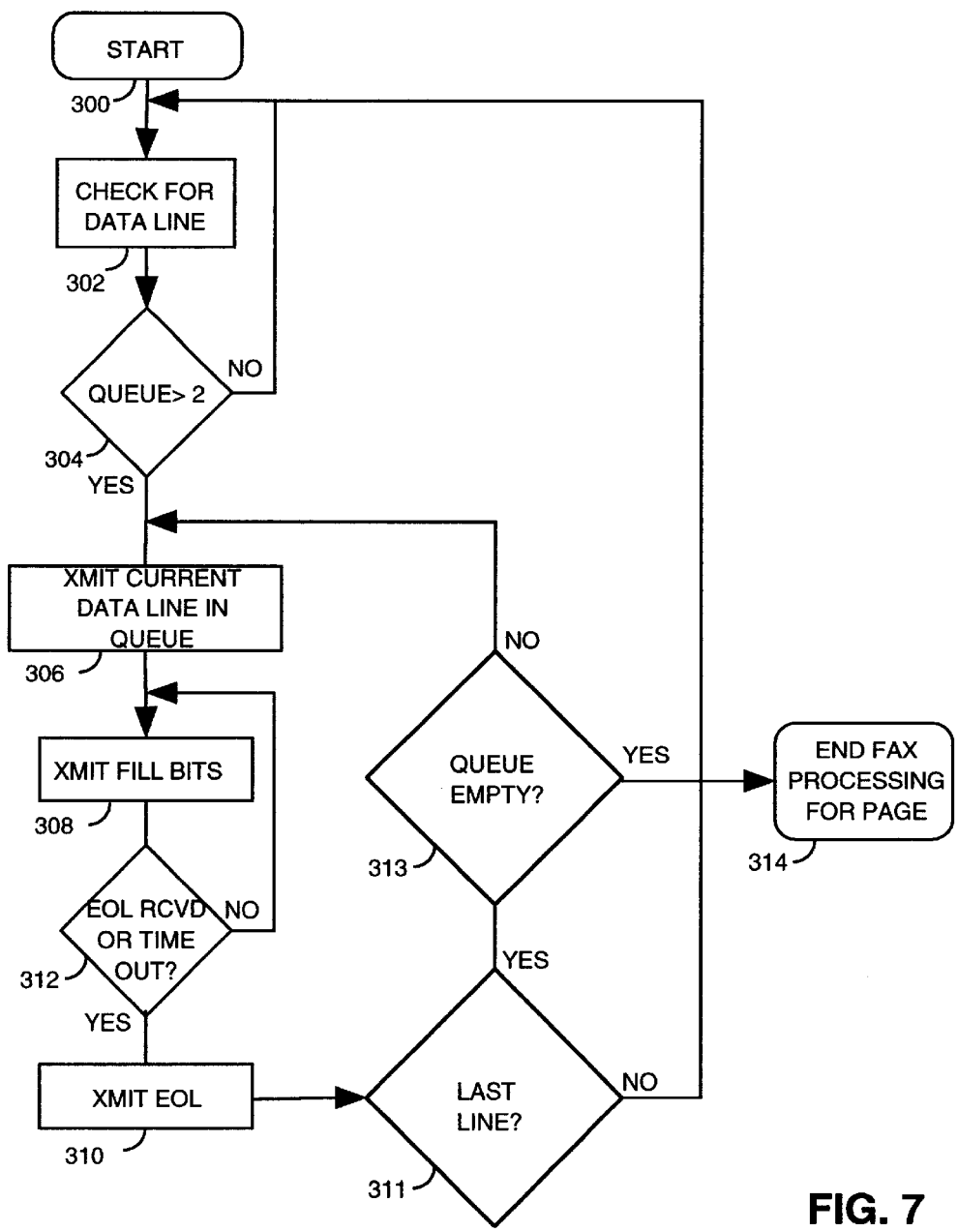
FIG. 7 is a flow diagram of the operation of the destination interface when the source fax transmission rate is less than the destination fax interface performed in accordance with one embodiment of the invention.

FIG. 7 is a flow diagram illustrating the steps performed by destination interface 24b during fax page processing when performed in accordance with one embodiment of the invention. The fax processing begins at step 300 and at step 302 destination interface 24b checks for a data line from source interface 24a, and if received adds that line to a data line queue. It should be noted that the data line can be received at a rate that is lower than the destination fax transmission rate D_RATE.

At step 304, it is determined if fewer than two lines are queued, and if not step 302 is performed again. If so, the oldest data line in the queue is transmitted at the higher data rate to destination fax machine 18b at step 306. That is, the queue is operating in a first-in-first-out (FIFO) manner.

After transmission of the data line at the higher transmission rate, destination interface 24b transmits additional fill bits to destination fax machine 18b at step 308. After transmission of the fill bits, destination interface 24b determines at step 312 if an end of line (EOL) has been received for the current data line from source interface 24a, or if a timeout has expired, and if not, more fill bits are transmitted at step 308. If an EOL has been received or a timeout has expired, an EOL is transmitted to destination fax machine 18b at step 310 if the required MSLT time has also been met. If the required MSLT time has not been met, additional fill bit are transmitted until the required MSLT time is satisfied. In the preferred embodiment of the invention, the timeout is approximately equal to 2 seconds, although timeouts of between 1 to 5 seconds are also preferred.

At step 311, it is determined if the last data line has been received, and if not, step 302 is performed again. If the last data line has been received, it is determined at step 313 if the data line queue is empty, and if not step 306 is performed again. If the queue is empty, the fax processing for the page ends at step 214.

Figure 8:
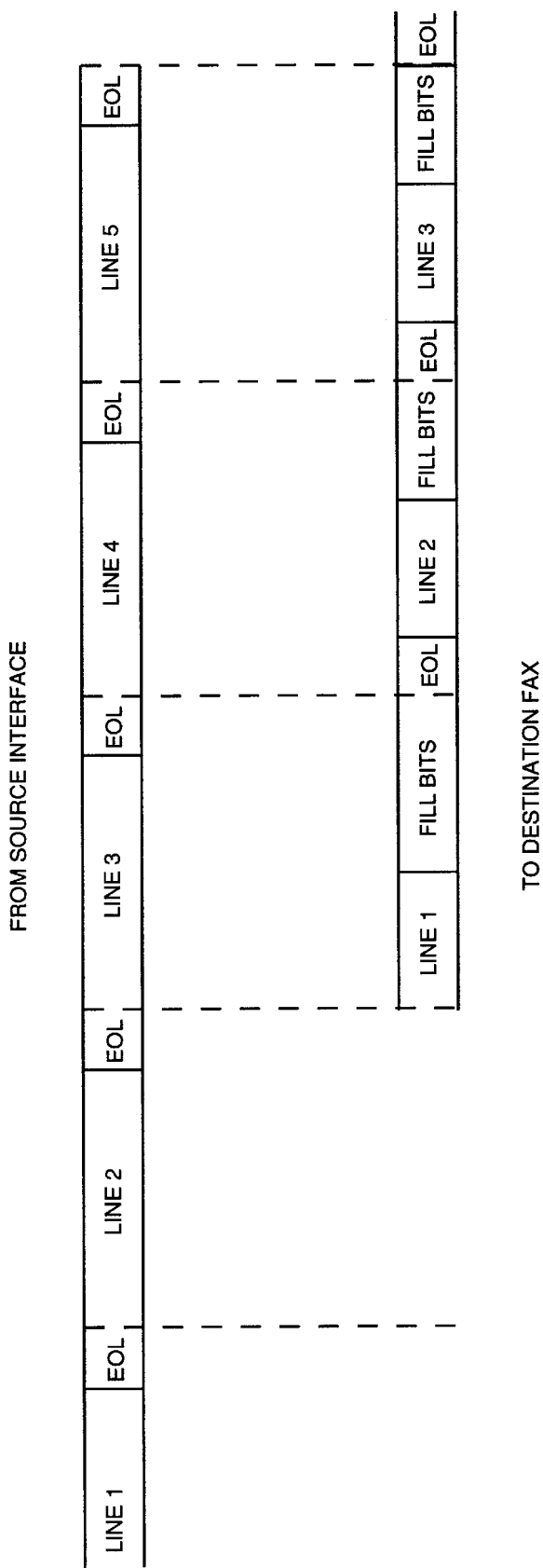
FIG. 8 is a timing diagram illustrating the transmission of data via the destination interface when performed in accordance with one embodiment of the invention.

FIG. 8 is a timing diagram further illustrating the operation of destination interface 24b when the destination fax transmission rate D_RATE is higher than the source fax transmission rate S_RATE in accordance with one embodiment of the invention. Time goes from left to right, and the top line represents data received from source interface 24a, and the bottom line represents data transmitted to destination fax machine 18b.

In accordance with performance of the steps set forth in FIG. 5, a first and second line of data are received including an end of line message (EOL), and the lines are entered into a data line queue (not shown). After receipt of end of line for the second line, transmission of the first line to destination fax machine 18b at the higher transmission rate begins.

In the exemplary embodiment shown, the transmission of line 1 to destination fax machine 18b is finished sooner than reception of line 3 from source interface 24a because it is being performed at a higher data rate. Thus, to postpone transmission of line 2, fill bits are transmitted until the end of line message for line 3 is received, at which time an end of line message for line 1 is transmitted. The process continues until a page of data has been transmitted.

Queuing received data before forwarding the data lines to destination fax machine 18b allows proper transmission to take place when the transmission rates are mismatched because fill bits can be inserted at the end of each line without interrupting the flow of data. Inserting fill bits in this manner is necessary because it is the only place such fill bits can be inserted without disrupting the accurate transmission of the fax data. Additionally, queuing received data lines also allows compensation for variable channel delay as the queue can supply necessary data lines during such delays maintaining a constant flow of data to the destination fax.

Figure 9:
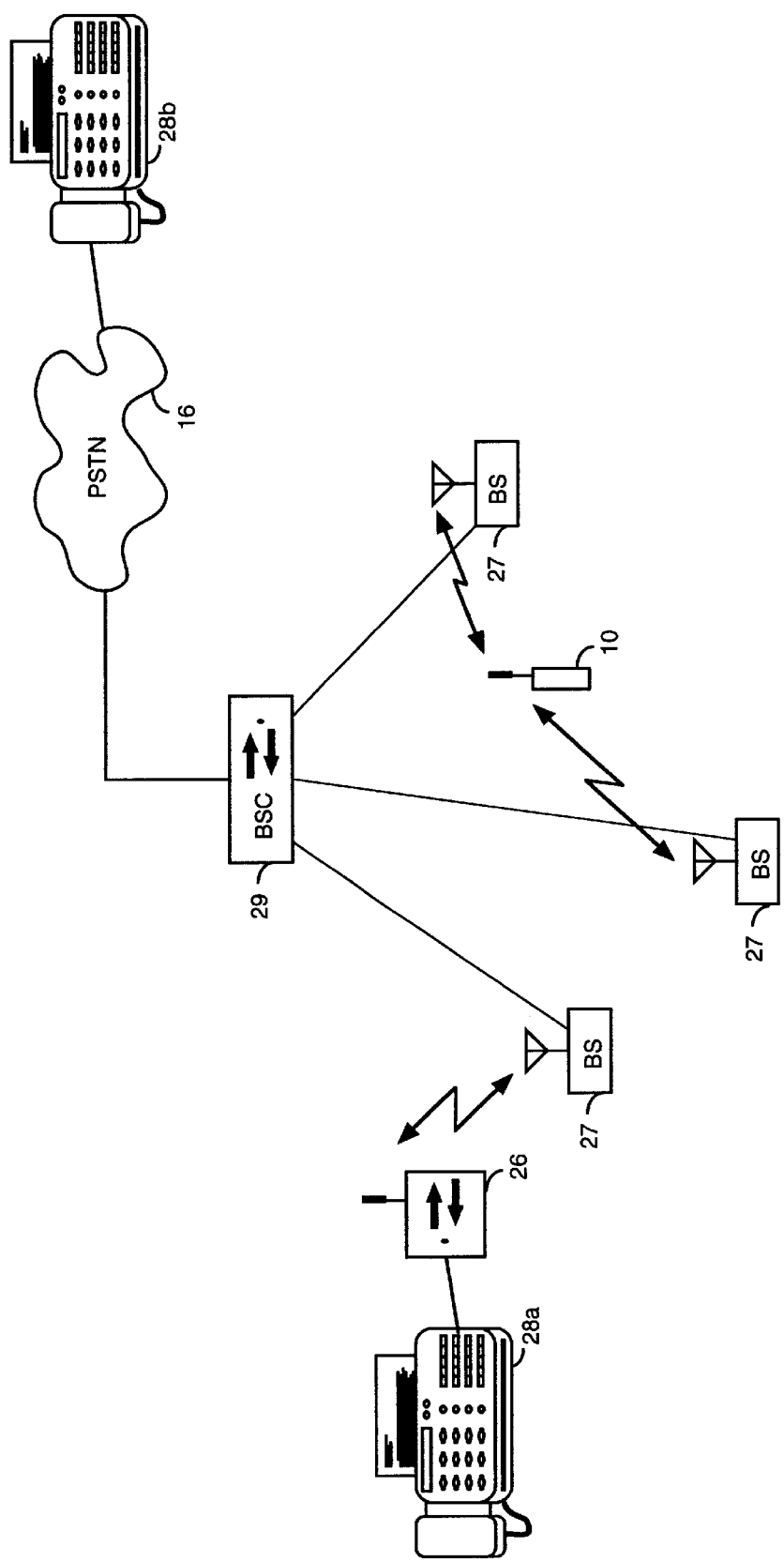
FIG. 9 is a block diagram of a cellular telephone system when configured in accordance with the use of the present invention.

FIG. 9 is an illustration of a cellular telephone system configured to process analog fax transmissions in accordance with one embodiment of the invention. The wireless digital telecommunications service subscriber is provided with a modified subscriber unit 26 to which analog fax machine 28a is connected. Modified subscriber unit 26 includes an analog fax interface, and interfaces with a base station 27 with RF signals. In the preferred embodiment of the invention, the RF signals are modulated in accordance with the IS-95 over-the-air interface standard.

Base station 27 is coupled to base station controller (BSC) 29 which also includes an analog fax interface. BSC 29 interfaces with analog fax machine 28b by way of PSTN 16.

During a fax transmitted from analog fax machine 28a to analog fax machine 28b, modified subscriber unit 26 acts as the source interface and BSC 29 acts as the destination interface. During a fax transmitted from analog fax machine 28b to analog fax machine 28a, BSC 29 acts as the source interface, and modified subscriber unit 26 acts as the destination interface.

Thus, a digital network interface that is compatible with standard analog fax machines has been described. While the description includes an embodiment configured for use with a wireless cellular telephone system, the invention may be used in conjunction with other digital networks including wire-based digital networks.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A system for transmitting a fax from a source fax machine to a destination fax machine over a variable rate digital channel comprising:

source interface means:

for receiving a first analog information signal from the source fax machine at a first transmission rate, wherein the first transmission rate is less than or equal to an average data rate of the variable rate digital channel;

for converting the first analog information signal into a digital information signal;

for generating a plurality of control signals;

for transmitting the digital information signal and the plurality of control signals via the variable rate digital channel;

for receiving a plurality of destination interface device responses via the variable rate digital channel;

for creating a first training session between the source interface means and the source fax machine; and for misinforming the source fax machine that the source fax machine is communicating with a fax machine with V.27ter and V.29 capabilities if the destination fax machine is a fax machine with only V.29 capability; and, destination interface means:

for receiving the digital information signal and the plurality of control signals;

for converting the digital information signal into a second analog information signal;
for transmitting the second analog information signal to the destination fax machine at a second transmission rate, wherein the second transmission rate is greater than or equal to the first transmission rate;
for generating a set of instructions for transmission to the destination fax machine, wherein the set of instructions is generated by the plurality of control signals;
for receiving a plurality of destination fax machine responses;
for converting the plurality of destination fax machine responses into the plurality of destination interface device responses;
for transmitting the plurality of destination interface device responses to the source interface means; and,
for creating a second transmission between the destination interface means and the destination fax machine, wherein the first training session results in the first transmission rate and the second training session results in the second transmission rate.

2. A system for transmitting a fax from a source fax machine to a destination fax machine over a variable rate digital channel comprising:
source interface means:
for receiving a first analog information signal from the source fax machine at a first transmission rate, wherein the first transmission rate is less than or equal to an average data rate of the variable rate digital channel;
for converting the first analog information signal into a digital information signal;
for generating a plurality of control signals;
for transmitting the digital information signal and the plurality of control signals via the variable rate digital channel;
for receiving a plurality of destination interface device responses via the variable rate digital channel; and
for transmitting a preamble indicator to the destination interface means, wherein the preamble indicator is one of the plurality of control signals and indicates the start of transmission of a source fax preamble message; and
destination interface means:
for receiving the digital information signal and the plurality of control signals;
for converting the digital information signal into a second analog information signal;
for transmitting the second analog information signal to the destination fax machine at a second transmission rate, wherein the second transmission rate is greater tan or equal to the first transmission rate;
for generating a set of instructions for transmission to the destination fax machine, wherein the set of instructions is generated by the plurality of control signals;
for receiving a plurality of destination fax machine responses;
for converting the plurality of destination fax machine responses into the plurality of destination interface device responses;
for transmitting the plurality of destination interface device responses to the source interface means; and
for generating a new preamble message before the end of transmission of the source fax preamble message and for transmitting the new preamble message to the destination fax machine.

3. A system for transmitting a fax from a source fax machine to a destination fax machine over a variable rate digital channel comprising:
source interface means:
for receiving a first analog information signal from the source fax machine at a first transmission rate, wherein the first transmission rate is less than or equal to an average data rate of the variable rate digital channel;
for converting the first analog information signal into a digital information signal;
for generating a plurality of control signals;
for transmitting the digital information signal and the plurality of control signals via the variable rate digital channel;
for receiving a plurality of destination interface device responses via the variable rate digital channel; and
for generating a new preamble message before the end of transmission of the destination fax preamble message and for transmitting the new preamble message to the source fax machine; and,
destination interface means:
for receiving the digital information signal and the plurality of control signals;
for converting the digital information signal into a second analog information signal;
for transmitting the second analog information signal to the destination fax machine at a second transmission rate, wherein the second transmission rate is greater than or equal to the first transmission rate;
for generating a set of instructions for transmission to the destination fax machine, wherein the set of instructions is generated by the plurality of control signals;
for receiving a plurality of destination fax machine responses;
for converting the plurality of destination fax machine responses into the plurality of destination interface device responses;
for transmitting the plurality of destination interface device responses to the source interface means; and
for transmitting a preamble indicator to the source interface means, wherein the preamble indicator is one of the plurality of destination interface device responses and indicates the start of transmission of a destination fax preamble message.

4. A system for transmitting a fax from a source fax machine to a destination fax machine over a variable rate digital channel comprising source:
interface means:
for receiving a first analog information signal from the source fax machine at a first transmission rate, wherein the first transmission rate is less than or equal to an average data rate of the variable rate digital channel;
for converting the first analog information signal into a digital information signal;
for generating a plurality of control signals;
for transmitting the digital information signal and the plurality of control signals via the variable rate digital channel;
for receiving a plurality of destination interface device responses via the variable rate digital channel; and
for modifying a DIS message from the destination fax machine to indicate that Group I and Group II fax processing are not supported; and, destination interface means:
  for receiving the digital information signal and the plurality of control signals;
  for converting the digital information signal into a second analog information signal;
  for transmitting the second analog information signal to the destination fax machine at a second transmission rate, wherein the second transmission rate is greater than or equal to the first transmission rate;
  for generating a set of instructions for transmission to the destination fax machine, wherein the set of instructions is generated by the plurality of control signals;
  for receiving a plurality of destination fax machine responses;
  for converting the plurality of destination fax machine responses into the plurality of destination interface device responses; and
  for transmitting the plurality of destination interface device responses to the source interface means.

5. A system for transmitting a fax from a source fax machine to a destination fax machine over a variable rate digital channel comprising:
  source interface means:
    for receiving a first analog information signal from the source fax machine at a first transmission rate, wherein the first transmission rate is less than or equal to an average data rate of the variable rate digital channel, wherein a fluctuation in the average data rate of the variable rate channel is compensated by increasing a minimum scan line time in a DIS message from the destination fax machine, wherein the DIS message is one of the plurality of destination fax machine responses converted by the destination interface means;
    for converting the first analog information signal into a digital information signal;
    for generating a plurality of control signals;
    for transmitting the digital information signal and the plurality of control signals via the variable rate digital channel; and
    for receiving a plurality of destination interface device responses via the variable rate digital channel; and,
  destination interface means:
    for receiving the digital information signal and the plurality of control signals;
    for converting the digital information signal into a second analog information signal;
    for transmitting the second analog information signal to the destination fax machine at a second transmission rate, wherein the second transmission rate is greater than or equal to the first transmission rate;
    for generating a set of instructions for transmission to the destination fax machine, wherein the set of instructions is generated by the plurality of control signals;
    for receiving a plurality of destination fax machine responses;
    for converting the plurality of destination fax machine responses into the plurality of destination interface device responses; and
    for transmitting the plurality of destination interface device responses to the source interface means.

6. A system for transmitting a fax from a source fax machine to a destination fax machine over a variable rate digital channel comprising:
  source interface means:
    for receiving a first analog information signal from the source fax machine at a first transmission rate, wherein the first transmission rate is less tan or equal to an average data rate of the variable rate digital channel;
    for converting the first analog information signal into a digital information signal;
    for generating a plurality of control signals;
    for transmitting the digital information signal and the plurality of control signals via the variable rate digital channel;
    for receiving a plurality of destination interface device responses via the variable rate digital channel;
    for creating a first training session between the source interface means and the source fax machine, the first training session resulting in the first transmission rate; and
    for delaying the completion of the first training session until the source interface means receives a first message; and,
  destination interface means:
    for receiving the digital information signal and the plurality of control signals;
    for converting the digital information signal into a second analog information signal;
    for transmitting the second analog information signal to the destination fax machine at a second transmission rate, wherein the second transmission rate is greater than or equal to the first transmission rate;
    for generating a set of instructions for transmission to the destination fax machine, wherein the set of instructions is generated by the plurality of control signals;
    for receiving a plurality of destination fax machine responses;
    for converting the plurality of destination fax machine responses into the plurality of destination interface device responses;
    for transmitting the plurality of destination interface device responses to the source interface means;
    for creating a second training session between the destination interface means and the destination fax machine, the second training session resulting in the second transmission rate; and
    for transmitting a first message, the first message contains the second transmission rate from the second training session.

7. The system of claim 6, wherein the source interface means is further for delaying completion of the first training session by purposefully ignoring a TCF message from the source fax machine.

8. The system of claim 7, wherein the step of delaying completion of the first training session is accomplished by transmitting a failure to train message after receiving three TCF messages from the source fax machine.

9. A system for transmitting a fax from a source fax machine to a destination fax machine over a variable rate digital channel comprising:
  source interface means:
    for receiving a first analog information signal from the source fax machine at a first transmission rate, wherein the first transmission rate is less than or equal to an average data rate of the variable rate digital channel;
    for converting the first analog information signal into a digital information signal;
    for generating a plurality of control signals;
    for transmitting the digital information signal and the plurality of control signals via the variable rate digital channel;

for receiving a plurality of destination interface device responses via the variable rate digital channel; and for creating a first training session between the source interface means and the source fax machine, wherein the first training session results in the first transmission rate; and, destination interface means:

for receiving the digital information signal and the plurality of control signals;

for converting the digital information signal into a second analog information signal;

for transmitting the second analog information signal to the destination fax machine at a second transmission rate, wherein the second transmission rate is greater than or equal to the first transmission rate;

for generating a set of instructions for transmission to the destination fax machine, wherein the set of instructions is generated by the plurality of control signals;

for receiving a plurality of destination fax machine responses;

for converting the plurality of destination fax machine responses into the plurality of destination interface device responses;

for transmitting the plurality of destination interface device responses to the source interface means;

for creating a second training session between the destination interface means and the destination fax machine, wherein the second training session results in the second transmission rate;

for altering a minimum scan line time advertised the destination fax machine;

for transmitting the altered minimum scan line time to the source interface means; and for transmitting the second analog information signal to the destination fax machine using the minimum scan line time advertised by the destination fax machine.

10. A system for transmitting a fax from a source fax machine to a destination fax machine over a variable rate digital channel comprising:

source interface means:

for receiving a first analog information signal from the source fax machine at a first transmission rate, wherein the first transmission rate is less than or equal to an average data rate of the variable rate digital channel;

for converting the first analog information signal into a digital information signal;

for generating a plurality of control signals;

for transmitting the digital information signal and the plurality of control signals via the variable rate digital channel;

for receiving a plurality of destination interface device responses via the variable rate digital channel;

for creating a first training session between the source interface means and the source fax machine, wherein the first training session results in the first transmission rate;

for altering a minimum scan line time advertised by the destination interface means;

for transmitting the altered minimum scan line time to the source fax machine; and for transmitting the digital information signal to the destination interface means using the minimum scan line time advertised by the destination interface means; and destination interface means:

for receiving the digital information signal and the plurality of control signals;

for converting the digital information signal into a second analog information signal;

for transmitting the second analog information signal to the destination fax machine at a second transmission rate, wherein the second transmission rate is greater than or equal to the first transmission rate;

for generating a set of instructions for transmission to the destination fax machine, wherein the set of instructions is generated by the plurality of control signals;

for receiving a plurality of destination fax machine responses;

for converting the plurality of destination fax machine responses into the plurality of destination interface device responses;

for transmitting the plurality of destination interface device responses to the source interface means; and for creating a second training session between the destination interface means and the destination fax machine, wherein the second training session results in the second transmission rate.

11. A system for transmitting a fax from a source fax machine to a destination fax machine over a variable rate digital channel wherein the system compensates for the variable rate of the digital channel by transmitting an altered minimum scan line time from a source interface means to the source fax machine, wherein the altered minimum scan line time is greater than or equal to the minimum scan line time of the destination fax machine, the system comprising:

source interface means:

for receiving a first analog information signal from the source fax machine at a first transmission rate, wherein the first transmission rate is less than or equal to an average data rate of the variable rate digital channel;

for converting the first analog information signal into a digital information signal;

for generating a plurality of control signals;

for transmitting the digital information signal and the plurality of control signals via the variable rate digital channel;

for receiving a plurality of destination interface device responses via the variable rate digital channel; and for creating a first training session between the source interface means an the source fax machine, wherein the first training session results in the first transmission rate; and, destination interface means;

for receiving the digital information signal and the plurality of control signals;

for converting the digital information signal into a second analog information signal;

for transmitting the second analog information signal to the destination fax machine at a second transmission rate, wherein the second transmission rate is greater than or equal to the first transmission rate;

for generating a set of instructions for transmission to the destination fax machine, wherein the set of instructions is generated by the plurality of control signals;

for receiving a plurality of destination fax machine responses;

for converting the plurality of destination fax machine responses into the plurality of destination interface device responses;

for transmitting the plurality of destination interface device responses to the source interface means; and, for creating a second training session between the destination interface means and the destination fax machine, wherein the second training session results in the second transmission rate.

12. A system for transmitting a fax from a source fax machine to a destination fax machine over a variable rate digital channel comprising:

source interface means:

for receiving a first analog information signal from the source fax machine at a first transmission rate, wherein the first transmission rate is less than or equal to an average data rate of the variable rate digital channel;

for converting the first analog information signal into a digital information signal;

for generating a plurality of control signals;

for transmitting the digital information signal and the plurality of control signals via the variable rate digital chanel;

for receiving a plurality of destination interface device responses via the variable rate digital channel; and for creating a first training session between the source interface means and the source fax machine; and destination interface means:

for receiving the digital information signal and the plurality of control signals;

for converting the digital information signal into a second analog information signal;

for transmitting the second analog information signal to the destination fax machine at a second transmission rate, wherein the second transmission rate is greater than or equal to the first transmission rate;

for generating a set of instructions for transmission to the destination fax machine, wherein the set of instructions is generated by the plurality of control signals;

for receiving a plurality of destination fax machine responses;

for converting the plurality of destination fax machine responses into the plurality of destination interface device responses;

for transmitting the plurality of destination interface device responses to the source interface means; and, for creating a second training session between the destination interface means and the destination fax machine, wherein the first training session results in the first transmission rate and the second training session results in the second transmission rate, wherein the first training session and the second training session begin with the same transmission rate, but at the end of the first training session and the end of the second transmission session, the first transmission rate is less than the second transmission rate.

13. A method for transmitting a fax between a source fax machine to a destination fax machine over a variable rate digital channel comprising the steps of:

communicating between a destination interface device with the destination fax machine at a destination fax transmission rate;

communicating between the destination interface device and a source interface device at an average rate of the variable rate digital channel;

communicating between a source interface device with the source fax machine at a source fax transmission rate that is less than or equal to the average rate of the variable rate digital channel and less than or equal to the destination fax transmission rate;

creating a destination training session between the destination interface device and the destination fax machine;

transmitting destination training Session information to the source interface device;

processing destination training session information at the source interface device; and creating a source training session between the source interface device and the source fax machine, wherein the completion of the source training session is delayed until the source interface device receives a first message from the destination interface device, wherein the first message contains the second transmission rate from the second training session.

14. A method for transmitting a fax from a source fax machine to a destination fax machine over a variable rate digital channel comprising the steps of:

receiving a first analog information signal at a first transmission rate from the source fax machine to a source interface device, wherein the first transmission rate is less than or equal to an average data rate of the variable rate digital channel;

converting the first analog information signal into a digital information signal at the source interface device;

generating a plurality of control signals at the source interface device;

transmitting the digital information signal and the plurality of control signals via the variable rate digital channel to a destination interface device;

receiving the digital information signal and the plurality of control signals at the destination interface device;

receiving a plurality of destination interface device responses via the variable rate digital channel at the source interface device from the destination interface device;

converting the digital information signal into a second analog information signal at the destination interface device;

transmitting the second analog information signal at a second transmission rate from the destination interface device to the destination fax machine, wherein the second transmission rate is greater than or equal to the first transmission rate;

generating a set of instructions for transmission to the destination fax machine at the destination interface device, wherein the set of instructions is determined by the plurality of control signals;

transmitting the set of instructions to the destination fax machine;

receiving a plurality of destination fax machine responses at the destination interface device, wherein the plurality of destination fax machine responses are based upon the set of instructions;

converting the plurality of destination fax machine responses into the plurality of destination interface device responses at the destination interface device;

transmitting the plurality of destination interface device responses to the source interface device;

creating a first training session between the source interface device and the source fax machine;

creating a second training session between the destination interface device and the destination fax machine, wherein the first training session results in the first transmission rate and the second training session results in the second transmission rate; and delaying the completion of the first training session until the source interface device receives a first message from the destination interface device, wherein the first message contains the second transmission rate from the second training session.

* * * * *